United States Patent
Thivent et al.

(10) Patent No.: US 9,979,889 B2
(45) Date of Patent: May 22, 2018

(54) COMBINED OPTICAL AND ELECTRONIC IMAGE STABILIZATION

(71) Applicant: Apple Inc., Cupertino, CA (US)

(72) Inventors: Damien J. Thivent, Santa Clara, CA (US); George E. Williams, Pleasanton, CA (US); Jianping Zhou, Fremont, CA (US); Richard L. Baer, Los Altos, CA (US); Rolf Toft, Palo Alto, CA (US); Sebastien X. Beysserie, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/457,377

(22) Filed: Mar. 13, 2017

(65) Prior Publication Data

US 2017/0280059 A1 Sep. 28, 2017

Related U.S. Application Data

(63) Continuation of application No. 14/864,709, filed on Sep. 24, 2015, now Pat. No. 9,596,411.
(Continued)

(51) Int. Cl.
*H04N 5/232* (2006.01)
*G06T 5/20* (2006.01)

(52) U.S. Cl.
CPC ........... *H04N 5/23287* (2013.01); *G06T 5/20* (2013.01); *H04N 5/23267* (2013.01)

(58) Field of Classification Search
None
See application file for complete search history.

(56) References Cited

U.S. PATENT DOCUMENTS 7,359,563 B1 4/2008 Dua
7,817,187 B2 10/2010 Silsby
(Continued)

FOREIGN PATENT DOCUMENTS

WO 2014147285 A1 9/2014

OTHER PUBLICATIONS

Zhou, et al., "Video Rolling Shutter Correction for Lens Movement in Optical Image Stabilization Cameras," U.S. Appl. No. 14/547,107, filed Nov. 18, 2014.

*Primary Examiner* — Mark T Monk
(74) *Attorney, Agent, or Firm* — Blank Rome LLP

(57) ABSTRACT

Techniques to improve a digital image capture device's ability to stabilize a video stream are presented. According to some embodiments, improved stabilization of captured video frames is provided by intelligently harnessing the complementary effects of both optical image stabilization (OIS) and electronic image stabilization (EIS). In particular, OIS may be used to remove intra-frame motion blur that is typically lower in amplitude and dominates with longer integration times, while EIS may be used to remove residual unwanted frame-to-frame motion that is typically larger in amplitude. The techniques disclosed herein may also leverage information provided from the image capture device's OIS system to perform improved motion blur-aware video stabilization strength modulation, which permits better video stabilization performance in low light conditions, where integration times tend to be longer, thus leading to a greater amount of motion blurring in the output stabilized video.

20 Claims, 9 Drawing Sheets

Related U.S. Application Data

(60) Provisional application No. 62/172,115, filed on Jun. 7, 2015.

(56) References Cited

U.S. PATENT DOCUMENTS

| | | |
|---|---|---|
| 8,335,350 B2 | 12/2012 | Wu |
| 8,520,084 B2 | 8/2013 | Tsai |
| 8,711,233 B2 | 4/2014 | Jefremov |
| 8,749,644 B2 | 6/2014 | Lee |
| 8,786,716 B2 | 7/2014 | Zhou |
| 8,947,529 B2 | 2/2015 | Strine |
| 9,100,575 B2 | 8/2015 | Lee |
| 9,413,963 B2 | 8/2016 | Beysserie |
| 2011/0096179 A1 | 4/2011 | Border |
| 2011/0234825 A1 | 9/2011 | Liu |
| 2013/0135430 A1 | 5/2013 | Liu |
| 2013/0141602 A1 | 6/2013 | Kuriyama |
| 2013/0294655 A1 | 11/2013 | Lim |
| 2014/0132784 A1 | 5/2014 | Chouly |
| 2014/0160309 A1 | 6/2014 | Karpenko |
| 2014/0267807 A1* | 9/2014 | Miyahara ........... H04N 5/23245 348/208.3 |

* cited by examiner

COMBINED OPTICAL AND ELECTRONIC IMAGE STABILIZATION

CROSS-REFERENCE TO RELATED APPLICATIONS

This application is related in subject matter to commonly-assigned U.S. patent application Ser. No. 14/547,107, filed Nov. 18, 2014, entitled, "Video Rolling Shutter Correction for Lens Movement in Optical Image Stabilization Cameras" ("the '107 application"), which is hereby incorporated by reference in its entirety. This application is also related in subject matter to commonly-assigned U.S. patent application Ser. No. 14/467,998, filed Aug. 25, 2014, entitled, "Low Light Video Image Stabilization Strength Modulation" ("the '998 application"), which is also hereby incorporated by reference in its entirety

BACKGROUND

This disclosure relates generally to the field of digital photography and video capture. More particularly, but not by way of limitation, it relates to techniques for improved stabilization of capture video frames by intelligently harnessing the complementary effects of both optical image stabilization (OIS) and electronic image stabilization (EIS).

A standard rule of thumb for capturing sharp, handheld imagery is that the camera's shutter speed should not be less than its shutter speed equivalent to the focal length of the lens. This rule holds that a 500 millimeter (mm) lens shouldn't be handheld at shutter speeds slower than $\frac{1}{500}$-second, a 300 mm lens slower than $\frac{1}{300}$-second, a 50 mm lens slower than $\frac{1}{50}$-second, and a 20 mm lens slower than $\frac{1}{20}$-second. With the application of software- and/or hardware-based stabilization technology, jitter caused by camera movement may be minimized, making it possible to transform shaky, handheld footage into steady, smooth shots.

One way to stabilize a video is to track a salient feature in the image and use this as an anchor point to "cancel out" all perturbations relative to it. This approach requires a priori knowledge of the image's content to, for example, identify and track a person or other salient object in the scene. Another approach to image stabilization searches for a "background plane" in a video sequence, and uses its observed distortion to correct for camera motion. These types of techniques that involve software- and/or hardware-enabled transformations to "warp" a captured image so as to "cancel out," i.e., stabilize, the jitter caused by camera movement after-the-fact will be referred to herein as "electronic image stabilization" (EIS) and/or "video image stabilization" (VIS) techniques. Another approach may use the output from a motion sensor, e.g., a gyroscope, as an input for estimating the amount of "warping" that needs to be done via the EIS transformations in order to stabilize the video frames.

In another approach, gyroscopically controlled electro-magnets (or other suitable mechanism) shift a floating lens element orthogonally to the lens barrel axis (i.e., the "optical axis") along the horizontal and vertical plane of the image and/or along the optical axis in a direction that is opposite that of the camera movement. Doing this can effectively neutralize any sign of camera shake. In a similar type of operation, a camera's imaging sensor may translated in the opposite direction of the camera's movements in order to dampen the effects of camera shake. These types of techniques that involve hardware-enabled corrections in the position of the image capture apparatus, e.g., by moving one or more elements in the optical stack, the image sensor itself, or the entire camera system, so as to "cancel out" the jitter caused by camera movement in "real-time" will be referred to herein as "optical image stabilization" (OIS) techniques.

One limitation of current EIS video stabilization techniques is that, because they primarily attempt to correct for frame-to-frame distortions between captured images, they do not do a good job of accounting for so-called "motion blur" occurring within images, e.g., due to the user's hand shaking during video capture. "Motion blur" may be defined as the apparent "streaking" or "blurring" of rapidly moving pixels in a still image or a sequence of images. Motion blur results when the composition of the image being recorded changes during the recording, i.e., exposure or integration, of a single frame, either due to rapid movement (of the camera or objects in the scene being captured) or long exposure times, i.e., "integration times."

The difficulties associated with stabilizing video frames exhibiting motion blur are further exacerbated in low light conditions due to the increased integration times needed to capture sufficient light in the recorded video frames. Longer integration times result in more motion blur in the recorded video frame. When such "low light" video is stabilized, the residual motion blur and associated "shimmering artifacts" often appear visible in the stabilized video. This may make the stabilized videos look unnatural and does not provide the user with the perceptual clues of video movement that would normally be associated with the presence of motion blur within a video frame.

Due to its ability to move one or more elements in the optical stack as the image is being captured, OIS can correct or reduce motion blur during capture. However, due to physical size limitations within most portable electronic devices, the OIS techniques do not provide enough correction range for typical video capture. In addition, OIS techniques can only correct for image translation, not affine/perspective correction, which can be done through "EIS" techniques.

Thus, what is needed are techniques to intelligently modulate the strengths—and types, i.e., EIS and OIS—of image stabilization techniques used to stabilize particular recorded video frames in a sequence of captured frames based, at least in part, on: 1.) estimated motion data recorded at the image capture device during capture; 2.) estimated lens position during capture; 3.) estimated light levels during capture; and/or 4.) the frequency band composition of the motion data recorded at the image capture device during capture. Such techniques are also preferably power efficient and computationally efficient.

SUMMARY

In one embodiment, the disclosed concepts provide a method to stabilize a video stream of image data as it is being captured at an image capture device. The method includes capturing a first time-sequenced set of images (e.g., a video stream), where each image has a capture time, lens position information, and associated motion information samples (the motion information samples may be provided, e.g., by one or more motion sensors of the image capture device, such as gyroscopes or accelerometers). The method further includes performing a high-pass filtering operation on the motion information. The method further includes performing optical image stabilization (OIS) by moving one or more elements of the optical stack in real-time based, at least in part, on only the portions of the motion information that have passed the high-pass filter.

Next, the method includes selecting a current image from the first time-sequenced set of images and determining a first stabilization strength value needed to apply a first "ideal" electronic image stabilization (EIS) transformation that would be needed to stabilize the current image, taking into account the amount of residual motion blur after OIS correction. Next, the method includes applying the determined first stabilization strength value to apply the "ideal" transformation to the current image. Next, the method includes subtracting the OIS signal (e.g., a lens position signal) for the current image from the transformation amounts calculated by the "ideal" EIS transformation for the current image, i.e., applying a "correction transform," to obtain an "adjusted EIS transformation" matrix.

The method may also determine an adjustment to the first stabilization strength value based, at least in part, on an estimated amount of motion blur in the current image, wherein the estimated amount of motion blur in the current image is based, at least in part, on: the motion information associated with the current image; an amount of OIS applied to the current image; the exposure time of the current image; and/or an estimated light level during the capture of the current image.

Finally, the method may apply the desired EIS techniques to the current image using the adjusted EIS transformation to stabilize the current image, and then the method may store the stabilized current image in a memory. In some embodiments, e.g., those wherein the image sensor of the image capture device employs a rolling shutter mechanism, the method may calculate the beginning and ending integration time for a portion of the image, e.g., for each row of pixels in the captured image, based on the frame capture timestamp, the rolling shutter readout time, and/or the exposure time to make more accurate motion estimates for each row of pixels in each captured image. A computer executable program to implement the methods described herein may be stored in any media that is readable and executable by a computer system.

DETAILED DESCRIPTION

Figure 1:
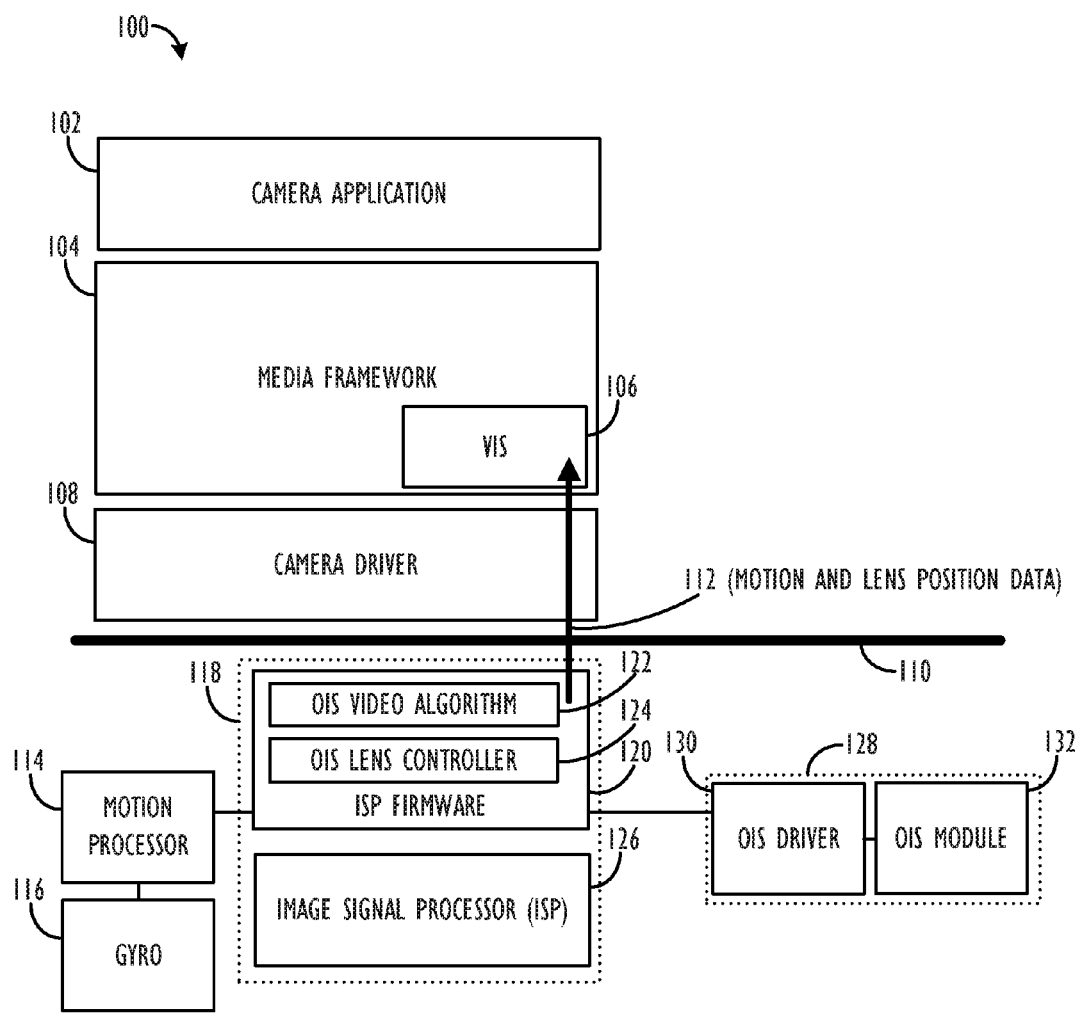
FIG. 1 shows, in block diagram form, a multifunction device having an OIS mechanism and a VIS framework, in accordance with some embodiments.

This disclosure pertains to systems, methods, and computer readable media to more effectively stabilize video images in real-time (i.e., as they are captured). In general, techniques are described herein for stabilizing video frames using both "optical image stabilization" (OIS) and "electrical image stabilization" (EIS) techniques. EIS is also referred to herein as simply, "video image stabilization" or (VIS).

While OIS techniques can involve physically moving some portion of the image capture apparatus hardware of an image capture device, EIS/VIS techniques typically involve software-implemented algorithms to use an "overscan" region and a look-ahead buffer comprising a number of video input frames. However, it is to be understood that the video image stabilization improvement techniques described herein may be employed in conjunction with any desired video image stabilization approach. ("Overscan" is the term given to the buffer of pixels around the edges of an image that are captured but not displayed to the user.)

More particularly, techniques are disclosed herein for the improved stabilization of captured video frames by intelligently harnessing the complementary effects of both optical image stabilization and electronic image stabilization. In particular, OIS may be used to remove high frequency unwanted motion that is typically lower in amplitude and causes motion blurring with longer integration times, while EIS may be used to remove residual low frequency unwanted frame-to-frame motion that is typically larger in amplitude. EIS can also be used to remove warping and perspective artifacts. The techniques disclosed herein may also leverage information provided from the image capture device's OIS system to perform improved motion blur-aware video stabilization strength modulation, which permits better video stabilization performance in low light conditions, where integration times tend to be longer, thus leading to a greater amount of motion blurring and the attendant "shimmering" artifacts in the output stabilized video.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that, in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of video processing systems having the benefit of this disclosure.

One approach to electronic image stabilization ("EIS" or "VIS") makes use of a tunable video stabilization strength value by first determining what sort of activity is causing the detected camera motion, setting the tuning value accordingly, and stabilizing in accordance with that value. For example, if no motion is detected, it may be possible to classify the "type of motion" as stationary and, as a result, apply very strict stabilization (i.e., a large video stabilization strength value). If, on the other hand, a large amount of camera motion is detected along a single axis, it may be possible to classify the type of motion as "strolling" (i.e., akin to what would be captured if the video was being recorded while the user was walking), at which point a different (e.g., smaller) video stabilization strength value may be applied. Further details describing certain approaches to VIS may be found in the '998 application and/or '107 application, each of which has been incorporated by reference.

As will be explained in further detail below, at a high level, the techniques described herein attempt to intelligently blend between OIS techniques and VIS techniques, harnessing the complementary aspects of each in order to provide improved video stabilization. Such techniques may also take OIS lens displacement signals into account when estimating the amount of motion blur in an image frame (since OIS moves the lens assembly in an effort to reduce motion blur), further enhancing the ability of the image capture device to provide stabilized video in low light conditions where integration times tend to be longer.

Referring to FIG. 1, a multifunction device 100 having an OIS mechanism and a VIS framework is shown in block diagram form, in accordance with some embodiments. Device 100 may be conceptually divided (as represented by dividing line 110) between the hardware system (below the line 110) and the software system (above the line 110). Components of the hardware system may include: gyroscope(s) 116 and motion processor 114. Motion processor 114 may comprise a dedicated processing device for receiving, parsing, and transmitting the device motion data collected from the gyroscope(s) 116 and/or other positional sensors in the device 100. The output from motion processor 114 may be fed into ISP block 118, comprising the Image Signal Processor (ISP) hardware 126 itself, as well as the various ISP firmware 120 components, including the OIS video algorithm 122 and the OIS lens controller 124, each of which will be described in greater detail with reference to FIG. 3, below. According to some embodiments, the OIS video algorithm 122 comprises a continuous, real-time and per axis strength optimization algorithm that minimizes panning artifacts and the appearance of "lag" in the display of captured images on the device's image preview display screen. The OIS video algorithm 122 and the OIS lens controller 124 are, in turn, in communication with the OIS hardware module 128, comprising OIS driver 130 and OIS module 132, each of which will be described in greater detail with reference to FIG. 3, below.

The software system (above the line 110) may comprise the camera software application 102 running on the device 100, a media framework 104 for providing core audio/visual pipelines and processing capabilities, including, e.g., a VIS module 106 for carrying out VIS algorithms, such as those described in the '998 application and '107 application, as well as a camera driver 108 for sending signals to the physical image capture apparatus of device 100. As illustrated, the ISP firmware 120 may send motion and lens position data 112, including lens displacement signals (e.g., from a Hall sensor) and/or time-stamped gyroscope motion samples, to the VIS module 106. As will be described in greater detail below, VIS module 106 may be improved in the embodiments described herein to intelligently adapt to the amount of stabilization provided by the OIS framework when determining how much VIS to apply to the captured image frames, e.g., by: taking OIS correction into account when performing motion blur estimation in low-light conditions; tuning determined low-light strength modulation parameters based on the OIS correction already provided to the image frames; and/or subtracting out the OIS correction from the VIS correction.

Figure 2A:
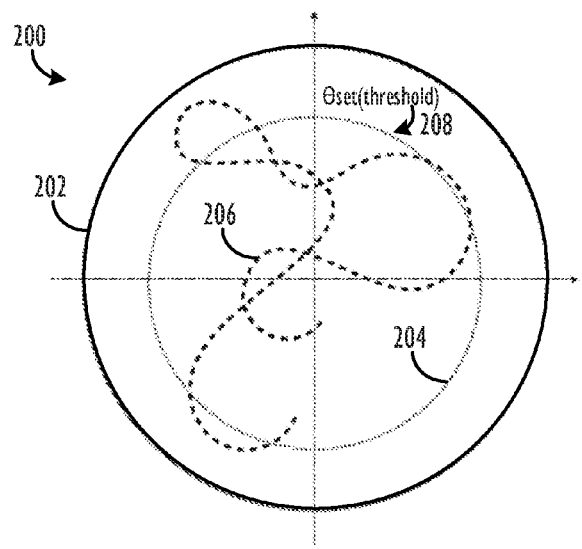
FIG. 2A shows, in graph form, an exemplary motion path of an image capture device along a particular axis, in accordance with some embodiments.

Referring now to FIG. 2A, a graph 200 of an exemplary motion path 206 of an image capture device along a particular axis is shown, in accordance with some embodiments. Outer circle 202 represents the maximum amount of correction range available to the image capture device in the particular axial direction. Inner circle 204 represents the angular set threshold 208 of motion for which the OIS mechanism is able to correct. Threshold 208 is the threshold above which an exemplary OIS stabilization algorithm may start to increase the cut-off frequency of a high-pass filter in order to maintain the lens movement within the available correction range 202, as will be described in greater detail with respect to high-pass filter 256 in FIG. 2B, below. As may be seen by following exemplary motion path 206, over time, the image capture device may be moved both within and beyond the set threshold 208.

Figure 2B:
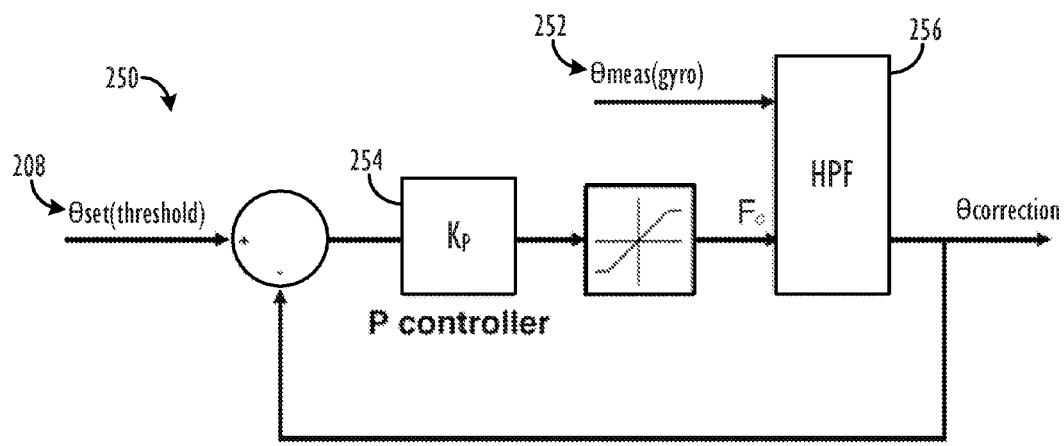
FIG. 2B shows, in block diagram form, an exemplary OIS video stabilization algorithm for operation in a combined OIS/VIS stabilization system, in accordance with some embodiments.

Referring now to FIG. 2B, an exemplary OIS video stabilization algorithm 250 for operation in a combined OIS/VIS stabilization system is shown in block diagram form, in accordance with some embodiments. In some such embodiments, the OIS video stabilization algorithm will focus only on the reduction of "high-frequency" motion components, e.g., greater than 1-5 Hz, as they are typically lower in amplitude than low frequency motion components. Owing to the relatively smaller correction range of OIS systems as compared to VIS systems, it may be beneficial to focus the use of OIS correction to lower amplitude and higher frequency unwanted motion. As illustrated in FIG. 2B, the measured movement of the image capture device from gyroscopes (or other positional sensors) is input to the algorithm at input 252, θmeas(gyro). This motion data may then be put through a high-pass filter 256. In some embodiments, high-pass filter 256 may comprise a first order infinite impulse response (IIR) high-pass filter. The remaining high-frequency components of the motion data may be subtracted from the motion data within the threshold limit 208, θset (threshold), and then passed to proportional controller 254. According to some embodiments, proportional controller 254 may move the "cut-off frequency," Fc, for the high-pass filter 256 based on the amplitude of the camera motion, e.g., between 0.6 Hz to 16 Hz. The resulting motion data having the appropriate high-frequency components with lower amplitude, θcorrection. The filtered motion data is used to derive the target lens position and the OIS lens controller moves the lens to the target lens position to compensate for the unwanted camera movement. The actual lens position is measured by the Hall sensor and may then be passed to the VIS module for the calculation of remaining stabilization to be applied to the captured image data via electronic image stabilization techniques.

As mentioned above, the VIS module may apply improved VIS algorithms in accordance with those found in the '998 application and/or '107 application, each incorporated by reference. In particular, embodiments disclosed herein may apply additional improvements and/or adjustments to the techniques found in the '998 application and/or '107 applications that leverage the combined optical and electrical image stabilization techniques described herein. For example, a standard VIS perspective transform may follow the following high-level equation:

$$P_{input} = C_m * R * (C_m)^{-1} * P_{output}, \quad \text{(Eqn. 1)}$$

wherein $P_{input}$ is the input pixel coordinate, $P_{output}$ is the output pixel coordinate, $C_m$ is the camera projection matrix, and R is the camera rotation matrix. As described, e.g., in the '998 application, the magnitude of the video stabilization strength value may be dependent on the amount of rotation applied by the camera rotation matrix, R, between the input pixel coordinate and the output pixel coordinate. A stabilization strength value may be thought of as a value used, in part, to determine a weighting or correction factor used to moderate movement of an image within its overscan region during stabilization operations. As long as the current stabilization strength value is found to keep the current frame (and, potentially, a number of upcoming or, "future," frames, as defined in the '998 application) within its overscan region when applying the calculated stabilization transformations, the current stabilization strength value may continue to be used. When one of the current frame's "future" frames does not fit in its overscan, the stabilization strength value may be lowered until a value is found that predicts it will fit with the overscan.

According to some embodiments, the stabilization strength value may be further limited to a target maximum strength based, at least in part, on estimated amount of motion blur in the image. As is described in greater detail in the '998 application, the VIS operation may utilize motion information, e.g., time stamped gyroscope data points corresponding to the readout times of the various rows of the image sensor during the capture of a sequence of video frames, to compute the image capture device's orientation for each gyroscope sample data point recorded during the capture of the sequence of image frames. Once the device's orientation has been estimated, for each row of pixels in the current image, the operation may estimate an "image blur vector."

According to some embodiments, the image blur vector may be calculated by:
1.) Calculating the starting and ending integration times for the current row based on, e.g.: the frame capture timestamp, the rolling shutter readout time, and exposure time. The starting and ending integration times for a given pixel row, i, may be calculated using the following equations:

$$\text{startIntegration}\_i = \text{startIntegration}\_0 + i * \text{readoutTime}/\text{height}$$

$$\text{endIntegration}\_i = \text{startIntegration}\_i + \text{exposureTime};$$

2.) Calculating the camera orientation at the start of sensor integration by interpolating the gyroscope data based on time stamps;
3.) Calculating the camera orientation at the end of sensor integration by interpolating the gyroscope data based on time stamps;
4.) Calculating the camera rotation during the exposure period, i.e., the camera orientation change from the start of integration to the end of integration; and
5.) Calculating the image row blur vector and metric based on, e.g., camera rotation and lens position, f, which is based on lens motor current and calibration data.

According to some embodiments, the translation of the image during the frame capture in the x direction, tx, and y direction, ty, may be approximated by the following equations:

$$tx = f * R02 / R22$$

(where R02 refers to the entry in row 0 and column 2 of the full 3×3 rotation matrix, and R22 refers to the entry in row 2 and column 2 of the full 3×3 rotation matrix); and $$ty = f * R12 / R22$$

(where R12 refers to the entry in row 1 and column 2 of the full 3×3 rotation matrix).

Thus, the magnitude of the image row blur vector for a given row, i, i.e., the image row blur vector metric for row i, may be calculated using the following equation:

$$\text{blur}\_i = \text{sqrt}(tx * tx + ty * ty).$$

Those skilled in the art will understand that other techniques could be used to approximate the amount of blur present in the image, e.g., location-adaptive blur, blur estimates that take rotational motion in all three axes into account, etc. For the purposes described herein, however, only the blur due to translation along the axes perpendicular to the plane of the camera, e.g., tx or ty, are considered (since the dominant blur in the image will be due to image translation in the vast majority of images).

In the improved embodiments described herein, the calculation of tx and ty values may be further modified with the lens displacement signal information received from the OIS mechanism, wherein one or more parts of the lens assembly is moved to reduce motion blur. In particular, certain embodiments may subtract the OIS lens position signal from each of tx and ty, as follows:

$$tx\_\text{with}\_\text{ois}\_\text{video} = tx - Tx\_\text{lens}$$

$$ty\_\text{with}\_\text{ois}\_\text{video} = ty - Ty\_\text{lens}$$

The magnitude of the image row blur vector for a given row, i, i.e., the image row blur vector metric for row i, may then be calculated using the following modified equation to take OIS displacement into account:

$$\text{blur}\_i = \text{sqrt}(tx\_\text{with}\_\text{ois}\_\text{video} * tx\_\text{with}\_\text{ois}\_\text{video} + ty\_\text{with}\_\text{ois}\_\text{video} * ty\_\text{with}\_\text{ois}\_\text{video}).$$

Next, the VIS process may proceed to calculate the overall image blur metric based, e.g., on the weighted average of the image row blur vectors for each row in the image. According to one embodiment, the overall image blur is calculated according to the following equation:

$$\text{blur} = \text{sum}(w\_i * \text{blur}\_i) / \text{sum}(w\_i)$$

(where w_i is the weight assigned to row i).
As those of skill in the art will understand, various weighting schemes may be employed, such as a center-weighted scheme, a simple average, a median, a max, or a center-only weighting scheme, etc. Normally, central rows in the image will be weighted more heavily since human observers are typically more sensitive to motion in the center of images than at the periphery.

Next, the VIS process may optionally proceed to average the overall image blur metric over some number, n, of consecutive frames and then optionally proceed to calculate a target max stabilization strength value for the current image. As mentioned in the '998 application, if the amount of blur in the image is smaller (as is typically found in brighter images with shorter integration times), larger stabilization strengths may be employed without affecting the unwanted "shimmering" artifacts in the stabilized video. On the other hand, if the amount of blur in the image is larger (as is typically found in darker images with longer integration times), smaller stabilization strengths may be employed in an effort to mitigate the appearance of the aforementioned unwanted "shimmering" artifacts in the stabilized video (i.e., by letting the image sequence jitter slightly, rather than holding it perfectly stable, the motion blur will follow the natural trail of movement in the image sequence and not appear as anomalous to the viewer).

In embodiments where the OIS lens position signal is taken into account in the calculation of the image row blur vector metric, i.e., where the aforementioned tx_with_ois_video and ty_with_ois_video are used (as opposed to simply tx and ty), the low-light blur estimation will have accounted for the blur reduction already provided by the OIS mechanism, which, in itself, results in much higher VIS stabilization strength levels in low-light conditions.

As described in the '107 application, Eqn. 1 above may be modified to take into account the stabilization corrections imparted in real-time by the movement of OIS mechanism, resulting in Eqn. 2:

$$P_{input} = T\_lens * C_m * R * (C_m)^{-1} * P_{output}, \quad \text{(Eqn. 2)}$$

wherein T_lens represents a 3×3 lens translation matrix, as follows:

$$\begin{matrix} 1 & 0 & Tx\_lens \\ 0 & 1 & Ty\_lens, \\ 0 & 0 & 1 \end{matrix}$$

wherein Tx_lens and Ty_lens represent the position of the lens relative to the lens' optical center along the x-axis and y-axis directions, respectively.

Figure 3:
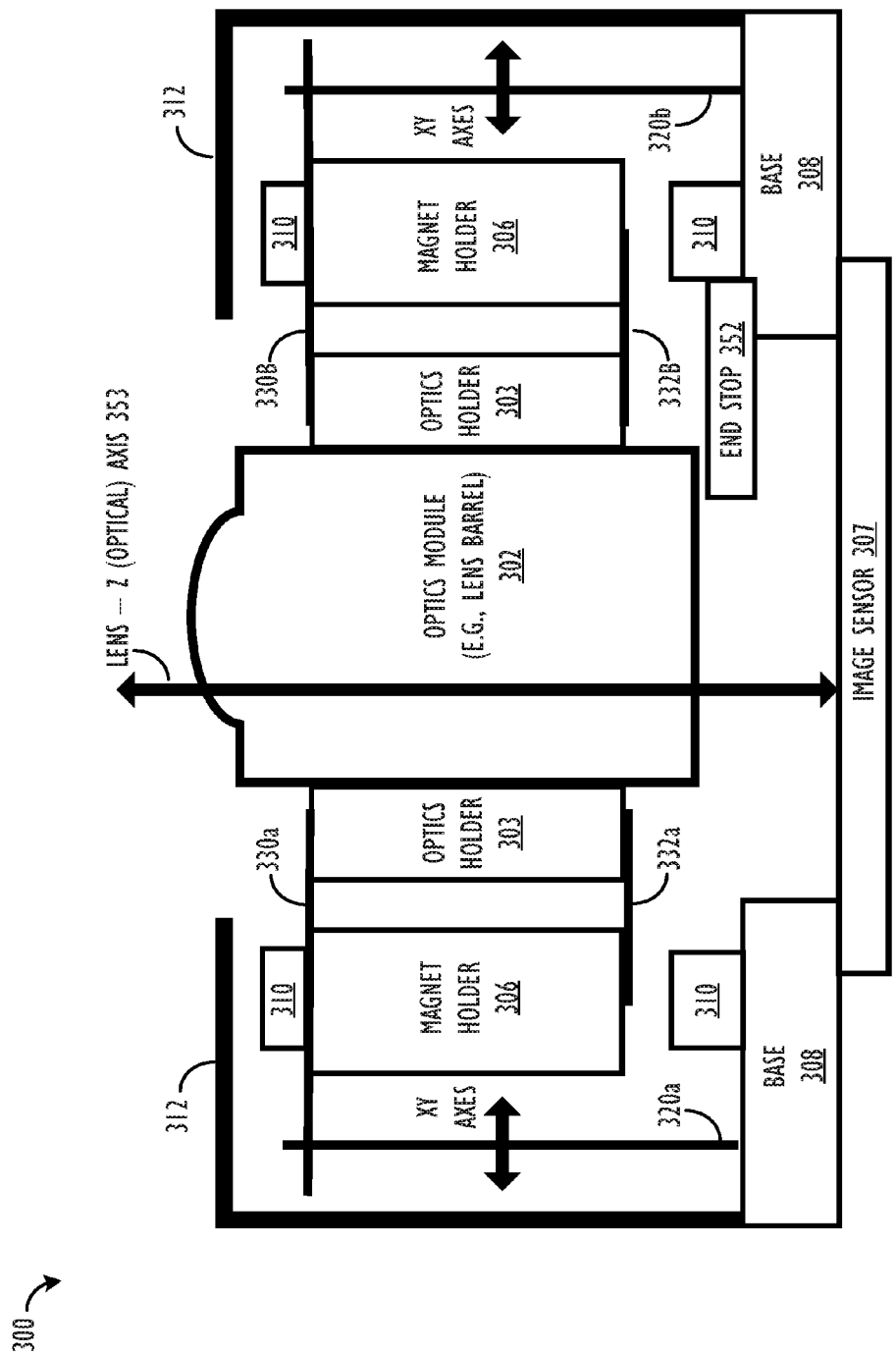
FIG. 3 depicts a side view of an example embodiment of actuator module components usable with methods of video image stabilization in cameras with OIS, in accordance with some embodiments.

Referring now to FIG. 3, a side view of an example embodiment of actuator module components usable with methods of video image stabilization in cameras with OIS is depicted, in accordance with some embodiments. An assembly of camera components 300 is shown, including an optics module (e.g., a lens barrel) 302 attached to a voice coil motor or other linear actuator including an optics holder 303, which includes a coil (not visible) and a magnet holder 306 for holding one or more magnets (also not visible). An image sensor 307, which may or may not be mounted on a substrate that is not shown separately in FIG. 3, is attached to a camera module base 308. The camera components may further include, in addition to components such as power and remote control connections not shown, a cover 312 and suspension wires 320.

Optics module 302 may be suspended on the base assembly 308 by suspension of the upper springs 330a/330b and the suspension wires 320a/320b. Camera components may include one or more of, but are not limited to, optics module 302, optics holder 303, magnet holder(s) 306, upper spring(s) 330a/330b, and lower spring(s) 332a/332b. The upper and lower spring(s) may be collectively referred to herein as "optics springs." An optics module (e.g., a lens assembly or lens barrel) 302 may be screwed, mounted or otherwise held in or by an optics holder 303. In at least some embodiments, the optics 302/optics holder 303 assembly may be suspended from or attached to the magnet holder 306 by upper spring(s) 330a/330b, and lower spring(s) 332a/332b. Note that upper spring(s) 330a/330b and lower spring(s) 332a/332b are flexible to allow the optics assembly 300 a range of motion along the Z (optical) axis 353 for optical focusing, wires 320a/320b are flexible to allow a range of motion on the XY plane orthogonal to the optical axis for optical image stabilization.

Note that, in some embodiments, a camera may not include magnets and magnet holder(s) 306, but may include a yoke or other structure 306 that may be used to help support the optics assembly on suspension wires 320a/320b via upper springs 330a/330b. In general, other embodiments of an optics assembly 300 may include fewer or more components than the example optics assembly 300 shown in FIG. 3. Also note that, while embodiments show the optics assembly 300 suspended on wires 320a/320b, other mechanisms may be used to suspend an optics assembly 300 in other embodiments.

In some embodiments, autofocus yoke (e.g., magnet holder(s) 306) acts as the support chassis structure for the autofocus mechanism of actuator 300. The lens carrier (optics holder 303) is suspended on the autofocus yoke by an upper autofocus (AF) spring 330a/330b and a lower optics spring 332a/332b. In this way, when an electric current is applied to the autofocus coil, Lorentz forces are developed due to the presence of the four magnets, and a force substantially parallel to the optical axis is generated to move the lens carrier, and hence lens, along the optical, i.e., Z, axis, relative to the support structure of the autofocus mechanism of the actuator, so as to focus the lens. In addition to suspending the lens carrier and substantially eliminating parasitic motions, the upper spring 330a/330b and lower spring 332a/332b also resist the Lorentz forces, and hence convert the forces to a displacement of the lens. This basic architecture shown in FIG. 3 is typical of some embodiments, in which optical image stabilization function includes moving the entire autofocus mechanism of the actuator (supported by the autofocus yoke) in linear directions orthogonal to the optical axis, in response to, e.g., the hand of the user of the image capture device shaking, as detected by some means, such a two- or three-axis gyroscope, which senses angular velocity. The movement imparted to the image capture device that is of interest here is the changing angular tilt of the camera in 'pitch and yaw directions,' which can be compensated by the linear movements of the lens relative to the image sensor.

In at least some embodiments, the suspension of the autofocus mechanism on the actuator 300 support structure may be achieved by the use of four corner wires 320a/320b, for example wires with a circular cross-section. Each wire 320 acts as a flexure beam capable of bending with relatively low stiffness, thus allowing motion in both optical image stabilization degrees-of-freedom. However, wire 320 used in some embodiments may be relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 320 is stiff in directions that require it to change in length, and hence the fixed points at the ends of each wire (eight points in total) will substantially form the vertices of a parallelepiped for all operational positions of the optical image stabilization mechanism. Position sensors 310, such as Hall sensors, may be included in some embodiments, and a mechanical end stop 352 is included to regulate the position of the moving components (e.g., optics module 302 or optics holder 303).

In some embodiments, a mobile device having a camera module 300 includes a lens assembly 302 mechanically coupled to a base 308 of the camera module 300. In some embodiments, the lens assembly 302 includes one or more lenses (not shown) subject to optical image stabilization using a voice coil motor or other linear actuator including an optics holder 303, which includes a coil (not visible) and a magnet holder 306 for holding one or more magnets (also not visible). In some embodiments, an image sensor 307 is mechanically coupled to the base 308 of the camera module. One or more position sensors 310 may be included. In some embodiments, at least one of the position sensors 310 is coupled to the lens assembly 302. In some embodiments, a non-transitory storage medium (not shown) stores program instructions that are computer-executable to implement estimating a starting position of the lens assembly 302 associated with captured pixel data from the image sensor 307. In some embodiments, the captured pixel data is captured from the image sensor 307. In some embodiments, the non-transitory storage medium stores program instructions that are computer executable to implement calculating from the starting position of the lens assembly 302 and position data received from the one or more position sensors 310 indicating lens movement associated with the captured pixel data from the image sensor 307.

In some embodiments, the non-transitory storage medium stores program instructions computer-executable to implement mapping the lens movement of lens assembly 302 into pixel movement associated with the captured pixel data from image sensor 307. In some embodiments, the non-transitory storage medium stores program instructions computer-executable to implement adjusting a transform matrix to reflect at least the pixel movement associated with the captured pixel data from image sensor 307.

In some embodiments, the one or more position sensors 310 further include a Hall sensor coupled to the lens assembly. In some embodiments, the one or more position sensors further include a gyroscopic sensor coupled to a multifunction device housing the camera module 300. In some embodiments, the captured pixel data represents data from a single row of sensor elements of the image sensor 307. In some embodiments, the captured pixel data represents data from a first row of sensor elements of the image sensor 307, and the non-transitory storage medium stores program instructions further include program instruction computer-executable to implement repeating the estimating, calculating lens movement, mapping adjusting, calculating a transform matrix, and recalculating for second pixel data, wherein the second pixel data represents data from a second row of sensor elements of the image sensor 307.

In some embodiments, the program instructions computer-executable to implement recalculating the captured pixel data from image sensor 307 using the transform matrix further include program instructions computer-executable to implement correcting the captured pixel data associated with the captured pixel data from image sensor 307 to adjust for motion of the camera module 300. In some embodiments, the captured pixel data represents light that has transited the one or more lenses of the lens assembly.

Figure 4:
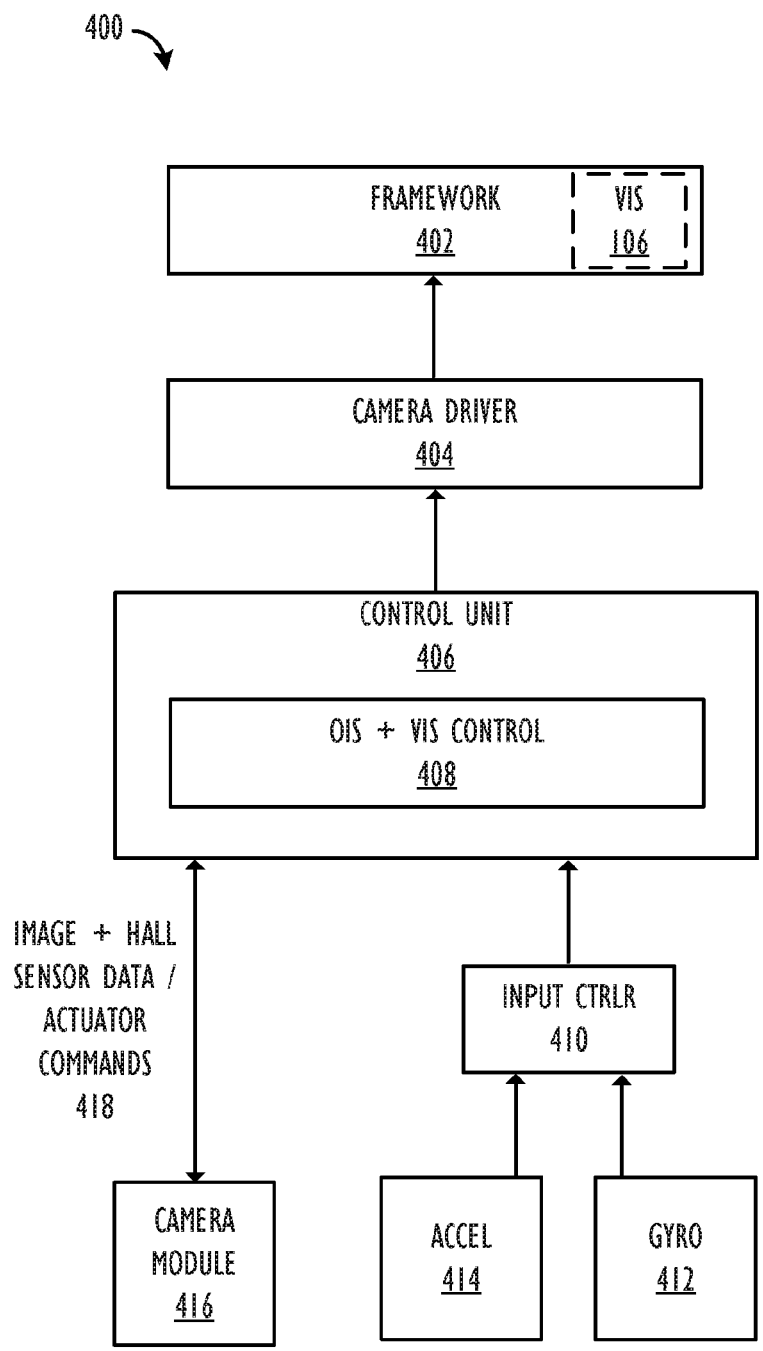
FIG. 4 illustrates components of a system for video image stabilization in cameras with OIS, in accordance with some embodiments.

Referring now to FIG. 4, components of a system 400 for video image stabilization in cameras with OIS are illustrated, in accordance with some embodiments. In FIG. 4, accelerometer 414 and gyroscope 412 may provide data to an input controller such as input controller 410, for example, they may provide accelerometer or gyroscope output data to the input controller. The input controller may process the data received from either or both of the accelerometer 414 and gyroscope 412, in accordance with the methods and processes disclosed herein and pass the results to OIS+VIS control 408 or to a control unit (e.g., control unit 406) as illustrated. As illustrated by arrow 418, OIS+VIS control 408 or control unit 406 may send lens movement or sensor control commands (i.e., actuator commands) to camera module 416, and may receive image and Hall sensor data from camera module 416. Either of the OIS+VIS control 408 or control unit 406 may process the received data and pass the results or the data to camera driver 404, which may perform calculations and pass on the results or the data to framework 402 or upper layer applications. In other embodiments, the VIS control 106 may alternatively be implemented directly in framework 402, as discussed above with respect to FIG. 1, rather than as a part of OIS+VIS control 408.

In some embodiments, an image capture device, e.g., a mobile device, having a camera module (e.g., camera module 416) includes a lens assembly mechanically coupled to a base of the camera module. In some embodiments, the lens assembly includes one or more lenses subject to optical image stabilization (e.g., controlled by OIS+VIS Control 408). In some embodiments, an image sensor is mechanically coupled to the base of the camera module. In some embodiments, the mobile device may comprise one or more orientation sensors (e.g., accelerometer 414 and/or gyroscope 412 and/or OIS+VIS control 408). In some embodiments, at least one of the position sensors in the camera module is coupled to the lens assembly. In some embodiments, a non-transitory storage medium stores program instructions computer-executable to implement estimating a starting position of the lens assembly associated with captured pixel data. For example, OIS+VIS control 408, control unit 406, or camera module 416, may estimate the starting position. In some embodiments, the captured pixel data is captured from the image sensor. In some embodiments, the non-transitory storage medium stores program instructions computer-executable to implement calculating from the starting position and position data received from the one or more position sensors lens movement associated with the captured pixel data. For example, OIS+VIS control 408, control unit 406 or camera module 416 may calculate from the starting position and position data received from the one or more position sensors lens movement associated with the captured pixel data.

In some embodiments, the non-transitory storage medium stores program instructions computer-executable to implement mapping the lens movement into pixel movement associated with the captured pixel data. For example, OIS+VIS control 408, control unit 406 or camera module 416 may comprise one or more modules that map the lens movement into pixel movement associated with the captured pixel data. In some embodiments, the non-transitory storage medium stores program instructions computer-executable to implement adjusting a transform matrix to reflect at least the pixel movement. For example, OIS+VIS control 408, control unit 406, or camera module 416, may comprise one or more modules that adjust a transform matrix to reflect at least the pixel movement. In some embodiments, the non-transitory storage medium stores program instructions computer-executable to implement recalculating the captured pixel data using the transform matrix. For example, OIS+VIS control 408, control unit 406 or camera module 416 may comprise one or more modules recalculating the captured pixel data using the transform matrix.

In some embodiments, the one or more position sensors further include a Hall sensor coupled to the lens assembly (e.g., as part of OIS+VIS control 408 or as part of the camera driver 404 or framework 402). In some embodiments, the one or more position sensors further include a gyroscopic sensor (e.g., 412) coupled to a multifunction device (e.g., framework 402) housing the camera module (e.g., 416). In some embodiments, the captured pixel data represents data from a single row of sensor elements of the image sensor. In some embodiments, as will be discussed in further detail below with reference to FIG. 6, the captured pixel data represents data from a first row of sensor elements of the image sensor, and the non-transitory storage medium stores program instructions further include program instructions computer-executable to implement repeating the estimating, calculating lens movement, mapping adjusting, calculating a transform matrix, and recalculating for second pixel data, wherein the second pixel data represents data from a second row of sensor elements of the image sensor. For example, OIS+VIS control 408, control unit 406 or camera module 416 may comprise one or more modules that implement repeating the estimating, calculating lens movement, mapping adjusting, calculating a transform matrix, and recalculating for second pixel data, wherein the second pixel data represents data from a second row of sensor elements of the image sensor.

In some embodiments, the program instructions computer-executable to implement recalculating the captured pixel data using the transform matrix further include program instructions computer-executable to implement correcting the captured pixel data to adjust for motion of the camera module. For example, OIS+VIS control 408, control unit 406 or camera module 416 may comprise one or more modules that implement recalculating the captured pixel data using the transform matrix further include program instructions computer-executable to implement correcting the captured pixel data to adjust for motion of the camera module. In some embodiments, the captured pixel data represents light that has transited the one or more lenses of the lens assembly.

Figure 5:
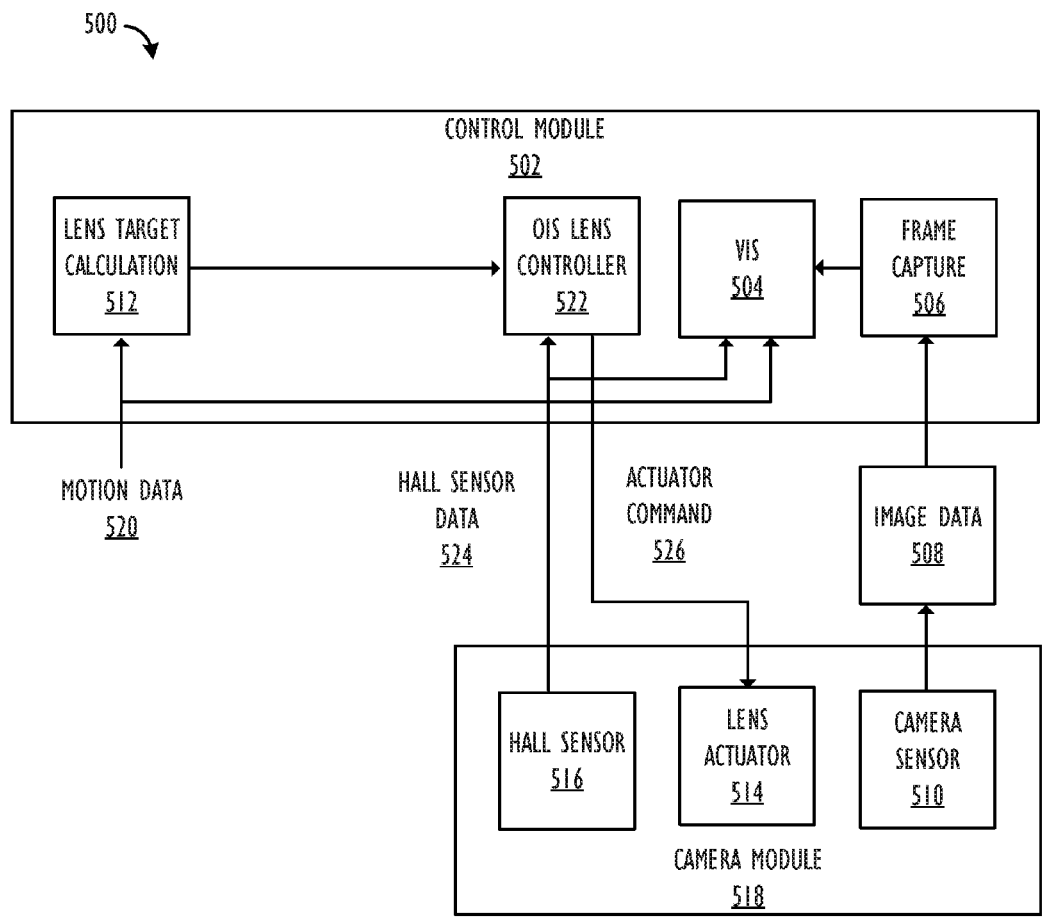
FIG. 5 illustrates components of a system for video image stabilization in cameras with OIS, in accordance with some embodiments.

Referring to FIG. 5, components of a system 500 for video image stabilization in cameras with OIS are illustrated, in accordance with some embodiments. A camera system 500 includes a camera module 518 and a control module 502. Camera module 518 includes a lens actuator 514, a camera sensor 510, and a Hall sensor 516. Camera system receives motion data 520, as described above, for example from an accelerometer or a gyroscope as shown in FIG. 4. Camera sensor 510 generates output image data 508, which is delivered to a frame capture module 506 of control module 502. Hall sensor 516 sends Hall sensor data 524 to optical image stabilization lens controller 522 of control module 502. Lens target calculation 512 is performed using motion data 520. Lens actuator 514 receives actuator commands from lens controller 522. VIS control block 504 receives both motion data 520 and Hall sensor data 524. As discussed above with reference to FIG. 4, VIS control block 504 may alternately be implemented as part of the framework itself, rather than as a part of control module 502.

In some embodiments, a mobile device having a camera module 518 includes a lens assembly mechanically coupled to a base of the camera module 518. In some embodiments, the lens assembly includes one or more lenses subject to optical image stabilization using an OIS lens controller 522. In some embodiments, an image sensor 510 is mechanically coupled to the base of the camera module 518. One or more position sensors 516 is included. In some embodiments, at least one of the position sensors 516 is coupled to the lens assembly. In some embodiments, a non-transitory storage medium stores program instructions computer-executable to implement estimating a starting position (lens target calculation 512) of the lens assembly associated with captured pixel data (image data 508). In some embodiments, the captured pixel data 508 is captured from the image sensor 510. In some embodiments, the non-transitory storage medium stores program instructions computer-executable to implement calculating, from the starting position and position data 524 received from the one or more position sensors 516, the lens movement associated with the captured pixel data 508.

In some embodiments, the non-transitory storage medium stores program instructions computer-executable to implement mapping the lens movement into pixel movement associated with the captured pixel data 508. In some embodiments, the non-transitory storage medium stores program instructions computer-executable to implement adjusting a transform matrix to reflect at least the pixel movement. In some embodiments, the non-transitory storage medium stores program instructions computer-executable to implement recalculating the captured pixel data using the transform matrix.

In some embodiments, the one or more position sensors 516 further include a Hall sensor coupled to the lens assembly. In some embodiments, the one or more orientation sensors further include a gyroscopic sensor coupled to a multifunction device housing the camera module for producing motion data 520. In some embodiments, the captured pixel data 508 represents data from a single row of sensor elements of the image sensor 510. In some embodiments, the captured pixel data 508 represents data from a first row of sensor elements of the image sensor 510, and the non-transitory storage medium stores program instructions further include program instruction computer-executable to implement repeating the estimating, calculating lens movement, mapping adjusting, calculating a transform matrix, and recalculating for second pixel data 508, wherein the second pixel data represents data from a second row of sensor elements of the image sensor 510.

In some embodiments, the program instructions computer-executable to implement recalculating the captured pixel data 508 using the transform matrix further include program instructions computer-executable to implement correcting the captured pixel data 508 to adjust for motion of the camera module. In some embodiments, the captured pixel data 508 represents light that has transited the one or more lenses of the lens assembly.

Figure 6:
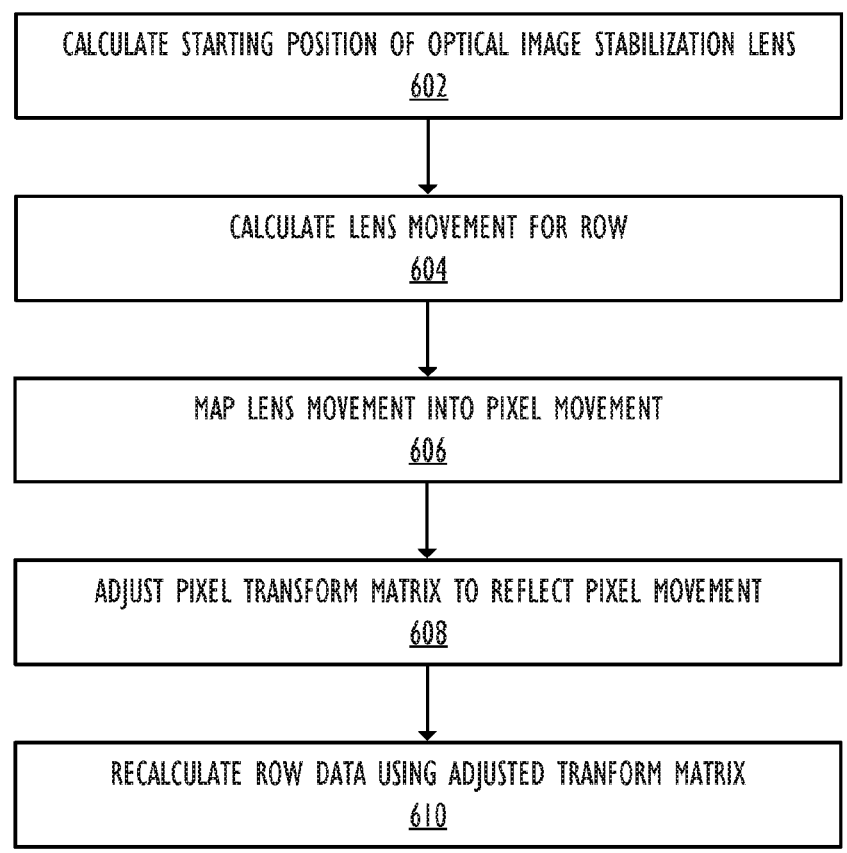
FIG. 6 illustrates, in flowchart form, a method usable for electronic image stabilization for image capture devices with optical image stabilization, according to at least some embodiments.

Referring to FIG. 6, a method 600 usable for electronic image stabilization for image capture devices with optical image stabilization is illustrated, according to at least some embodiments. As illustrated at block 602, a starting position of an optical image stabilization lens may be calculated from the Hall lens position data passed to method 600. Block 604 illustrates that that lens movement for a row may be calculated, for example, based on at least in part the calculated starting position illustrated in block 602, in embodiments. Block 606 illustrates that lens movement may be mapped into pixel movement, for example, the lens movement calculated in block 604 may be mapped into pixel movement based on the pixel size. At block 608, an ideal EIS transform matrix that has been calculated, e.g., based on camera motion and an amount of motion blur in the current image, may be adjusted to reflect pixel movement due to the OIS lens movement, such as the pixel movement described in block 606. Block 610 illustrates that row data may optionally be recalculated using an adjusted transform matrix, in embodiments. For example, the adjusted transform matrix described in 608 may be used to warp or recalculate the row data in 610, in embodiments.

Figure 7:
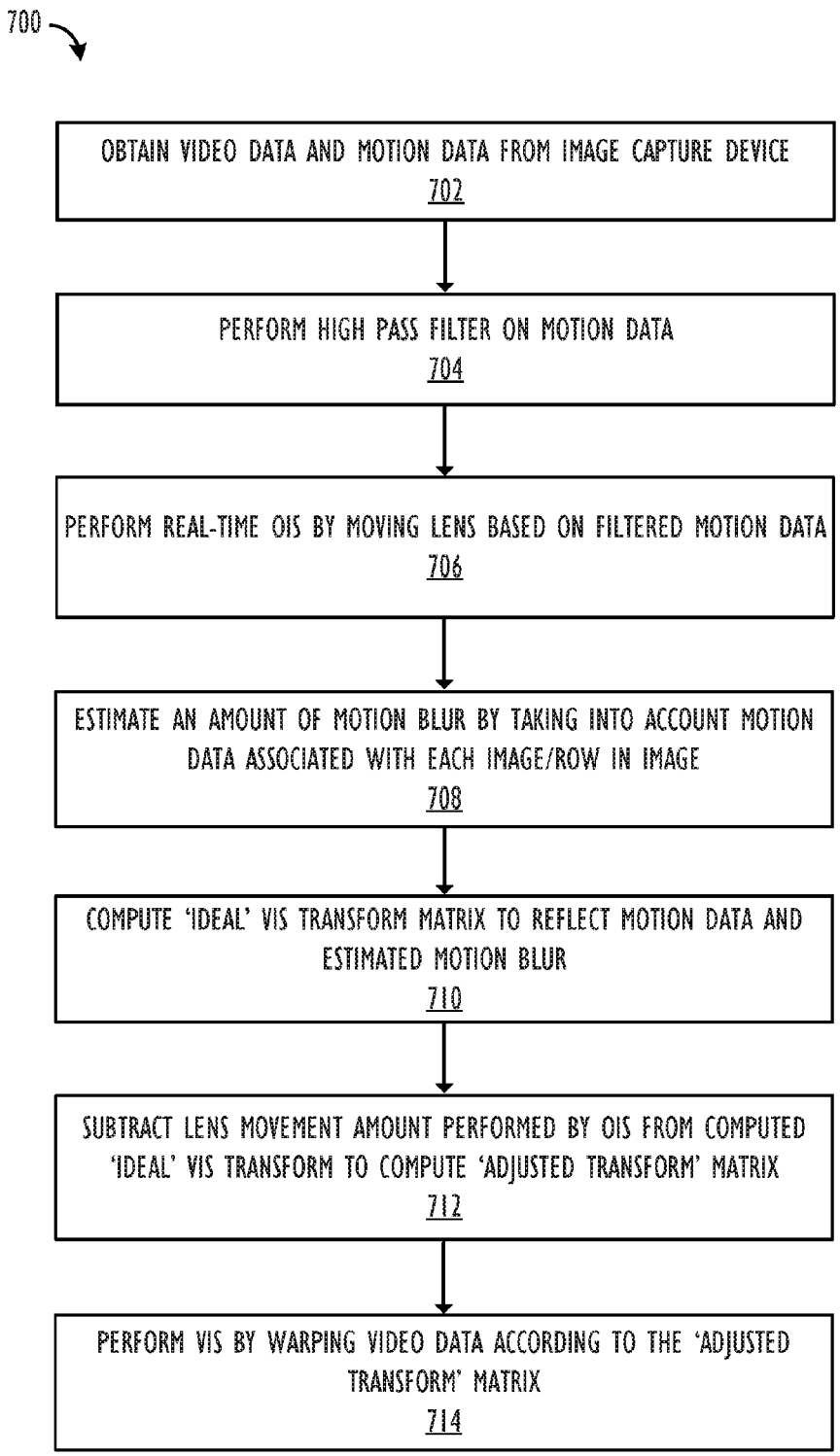
FIG. 7 illustrates, in flowchart form, an improved method usable for video image stabilization for image capture devices with optical image stabilization, according to at least some embodiments.

As described above in reference to at least FIG. 2, according to the improved embodiments described herein, the ideal EIS transformation correction matrix that is calculated by the video image stabilization process may be further adjusted before it is actually applied, based, at least in part, on the amount of high-frequency movement information that has already been filtered out of the image, e.g., by the image capture device's high-pass filtered OIS mechanism. Referring now to FIG. 7, an improved method 700 usable for video image stabilization for image capture devices with optical image stabilization is illustrated in flowchart form, according to at least some embodiments. As illustrated at block 702, the image capture device may obtain video image data and corresponding motion data relating to the motion of the image capture device during the capture of the corresponding images. At block 704, the method may perform a high-pass filter, e.g., a first order infinite impulse response (IIR) high-pass filter, to the motion data. The resulting high frequency motion data that passes the high-pass filter is likely to be lower in amplitude than the original motion data. The lower amplitude nature of the high frequency motion data makes it more amenable to correction via OIS techniques, which typically have a limited, e.g., 1-2 degree, correction range. At block 706, the high frequency-filtered motion data is compensated for using the image capture device's OIS mechanism to move one or more parts of the lens assembly accordingly. Then, the lens displacement signal returned from the OIS mechanism, motion data relating to the motion of the image capture device during the capture of the corresponding images, along with the current status of the frame buffer (i.e., a number of the most recently captured frames stored in a memory structure), may be sent to the VIS system. At block 708, the method may estimate an amount of "motion blur" in each image frame (and/or individual row of the image frame, in the case of rolling shutters) by analyzing the motion data relating to the motion of the image capture device and the high frequency-filtered motion compensated by OIS mechanism during the capture of the corresponding images. At block 710, the VIS system may compute an "ideal" transform matrix, reflecting the estimated amount of motion blur and movement of the image capture device during the readout of each sensor row of the image sensor (e.g., following the methods described above in reference to FIG. 6). However, before applying such "ideal" transform matrices, at block 712, the method may subtract out the pixel movement amount already performed by the OIS (as ascertained from the lens displacement signal sent to the VIS system at block 706) from the computed "ideal" transform matrices, resulting in a computed "adjusted EIS transform" matrix, which reflects the ideal transform matrix with the lens displacement already performed by the OIS system on the high-frequency motion components "subtracted" out. At block 714, the process may perform VIS by warping the video data according to the "adjusted EIS transform" matrix. As may now be more fully appreciated, each image frame may have been stabilized at least in part via OIS, and at least in part via VIS, with OIS accounting for the higher frequency components (e.g., above 1-5 Hz) of the unwanted motion data and VIS accounting for the lower frequency components (e.g., below 1-5 Hz) of the unwanted motion data. In addition, VIS also corrects the remaining rotation and perspective artifacts. Block 712 also ensures that the high-frequency movement information that has already been filtered out of the image by the image capture device's high-pass filtered OIS mechanism is not corrected for a second time by the computed 'ideal' EIS transform matrix. In other embodiments, the high-pass filtering operation may have a moveable cutoff frequency, wherein the movable cut-off frequency is based, at least in part, on an amplitude of at least one of the one or motion information samples associated with the captured video frames. The lower the cutoff frequency is set, the stronger the stabilization strength that is applied by OIS will be.

Figure 8:
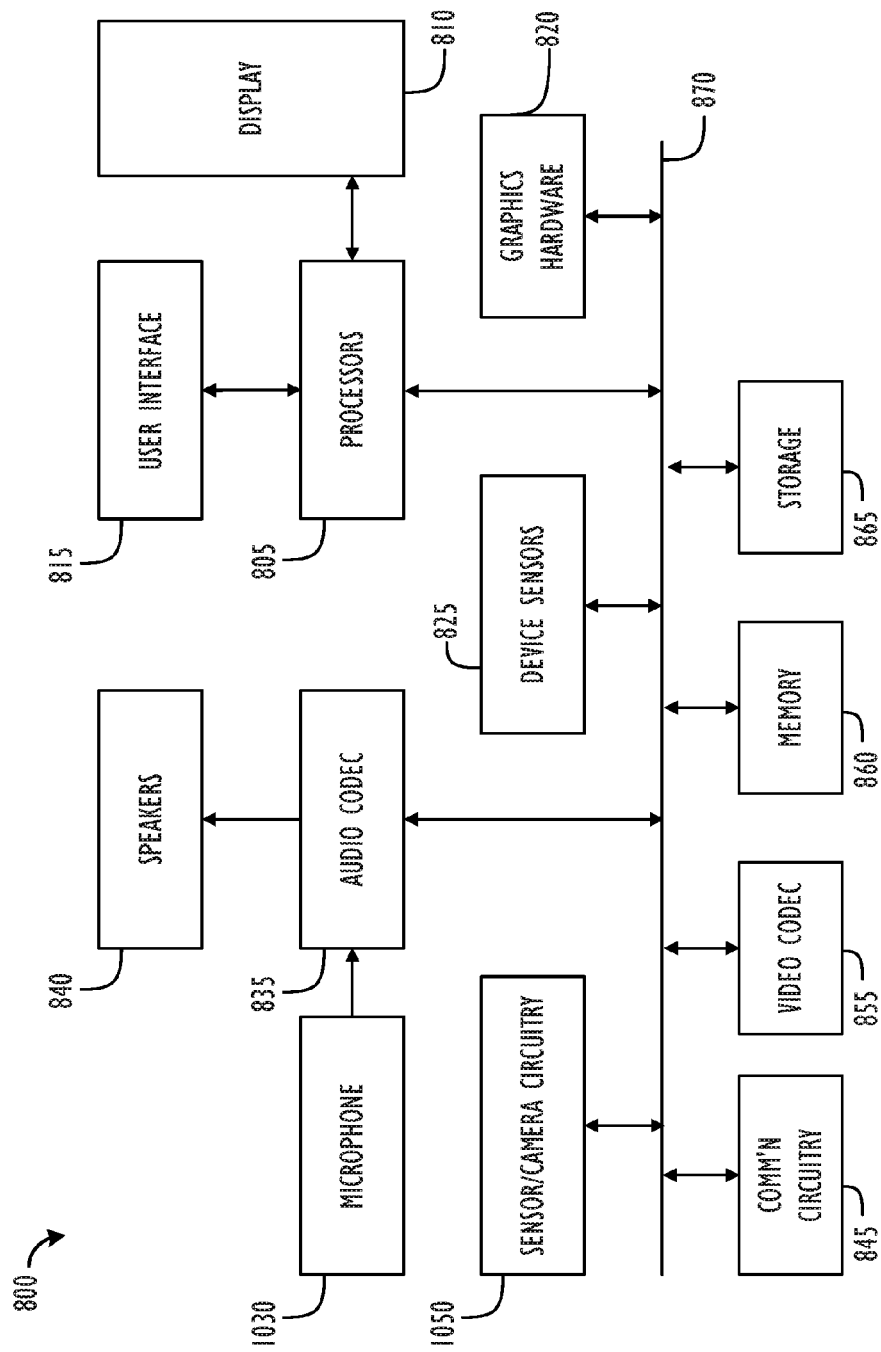
FIG. 8 shows, in block diagram form, a multi-function electronic image capture device, in accordance with some embodiments.

Referring to FIG. 8, a simplified functional block diagram of illustrative electronic device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream. In one embodiment, display 810 may display a video stream as it is captured, while processor 805 and/or graphics hardware 820 and/or image capture circuitry contemporaneously generate a stabilized version of the captured video stream storing the stabilized video stream in memory 860 and/or storage 865. In another embodiment, display 810 may display a stabilized version of a captured video sequence as it is captured. Processor 805 may be a system-on-chip, such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture circuitry 850 may capture video frames that may be processed to generate stabilized video in accordance with this disclosure. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices, such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805, such computer program code may implement one or more of the video stabilization methods described herein.

Figure 9:
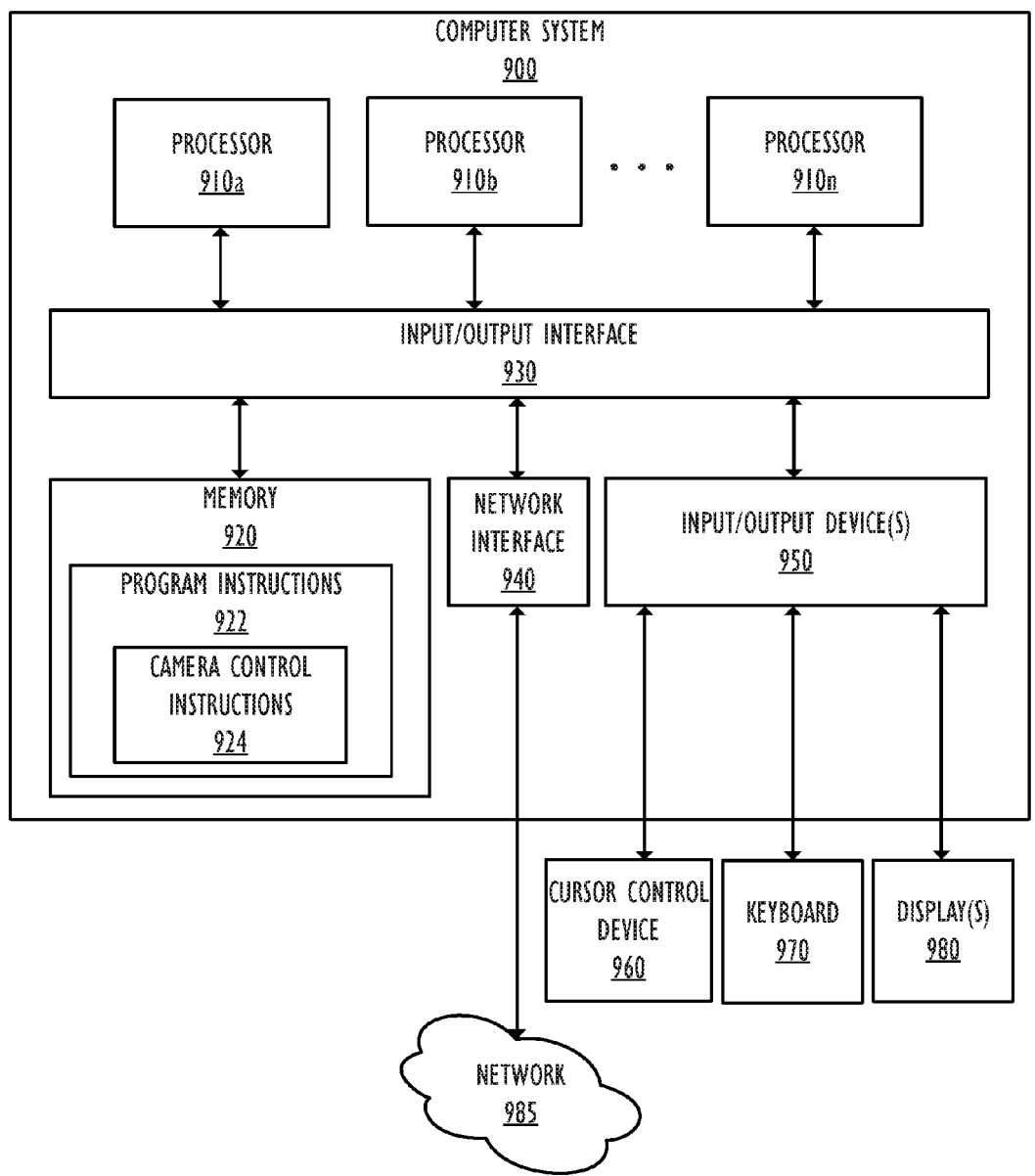
FIG. 9 shows, in block diagram form, an example computer system configured to implement aspects of the systems and methods for image capture device control, in accordance with one embodiment.

Referring to FIG. 9, an example computer system 900 configured to implement aspects of the systems and methods for image capture device control are shown in block diagram form, in accordance with one embodiment. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera component motion compensation calibration system for optical image stabilization as described herein, may be executed in one or more computer systems 900, which may interact with various other devices. Note that any component, action, or functionality described above may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store camera control program instructions 922 and/or camera control data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a camera lens assembly control application 924 incorporating any of the functionality described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may, in various embodiments, include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled.

The invention claimed is:

1. A non-transitory program storage device comprising instructions stored thereon to cause one or more processors to:
   obtain a first set of images and one or more motion information samples associated with the first set of images;
   perform, during the obtaining of one or more of the first set of images, a filtering operation on at least one of the one or more motion information samples, wherein the filtering operation comprises identifying a first set of high frequency motion information data and a first set of low frequency motion information data;
   cause a first amount of optical image stabilization (OIS) to be applied to one or more images in the first set of images based, at least in part, on the first set of high frequency motion information data;
   cause a first amount of electronic image stabilization (EIS) to be applied to one or more images in the first set of images based, at least in part, on the first set of low frequency motion information data and the applied first amount of OIS; and
   cause the stabilized first set of images to be stored in a memory.

2. The non-transitory program storage device of claim 1, wherein a first image from the first set of images is associated with a first subset of the motion information samples.

3. The non-transitory program storage device of claim 2, wherein a second image from the first set of images is associated with a second subset of the motion information samples that is different from the first subset of the motion information samples.

4. The non-transitory program storage device of claim 3, wherein a second amount of OIS is applied to the first image, and wherein the second amount of OIS applied to the first image is based only on an identified first set of high frequency motion information data from the first subset of the motion information samples.

5. The non-transitory program storage device of claim 3, wherein a second amount of EIS is applied to the first image, and wherein the second amount of EIS applied to the first image is based on at least an identified first set of low frequency motion information data from the first subset of the motion information samples and an identified first set of low frequency motion information data from the second subset of the motion information samples.

6. The non-transitory program storage device of claim 1, wherein the filtering operation comprises use of a first cut-off frequency, wherein the first set of high frequency motion data comprises motion data having a frequency component greater than the first cut-off frequency, and wherein the first set of low frequency motion data comprises motion data having a frequency component less than the first cut-off frequency.

7. The non-transitory program storage device of claim 6, wherein the first cut-off frequency comprises a movable cut-off frequency.

8. A video image stabilization method, comprising:
   obtaining a first set of images and one or more motion information samples associated with the first set of images;
   performing, during the obtaining of one or more of the first set of images, a filtering operation on at least one of the one or more motion information samples, wherein the filtering operation comprises identifying a first set of high frequency motion information data and a first set of low frequency motion information data;

causing a first amount of optical image stabilization (OIS) to be applied to one or more images in the first set of images based, at least in part, on the first set of high frequency motion information data;

causing a first amount of electronic image stabilization (EIS) to be applied to one or more images in the first set of images based, at least in part, on the first set of low frequency motion information data and the applied first amount of OIS; and causing the stabilized first set of images to be stored in a memory.

9. The method of claim 8, wherein a first image from the first set of images is associated with a first subset of the motion information samples.

10. The method of claim 9, wherein a second image from the first set of images is associated with a second subset of the motion information samples that is different from the first subset of the motion information samples.

11. The method of claim 10, wherein a second amount of OIS is applied to the first image, and wherein the second amount of OIS applied to the first image is based only on an identified first set of high frequency motion information data from the first subset of the motion information samples.

12. The method of claim 10, wherein a second amount of EIS is applied to the first image, and wherein the second amount of EIS applied to the first image is based on at least an identified first set of low frequency motion information data from the first subset of the motion information samples and an identified first set of low frequency motion information data from the second subset of the motion information samples.

13. The method of claim 8, wherein the filtering operation comprises use of a first cut-off frequency, wherein the first set of high frequency motion data comprises motion data having a frequency component greater than the first cut-off frequency, and wherein the first set of low frequency motion data comprises motion data having a frequency component less than the first cut-off frequency.

14. The method of claim 13, wherein the first cut-off frequency comprises a movable cut-off frequency.

15. A video image capture device, comprising:
a camera module comprising an image sensor;
memory communicatively coupled to the image sensor;
one or more motion sensors;
a lens assembly mechanically coupled to the camera module, wherein the lens assembly comprises one or more parts subject to optical image stabilization (OIS);
one or more processors operatively coupled to the image sensor, the memory, and the one or more motion sensors configured to perform instructions to cause the one or more processors to:

obtain a first set of images and one or more motion information samples associated with the first set of images;

perform, during the obtaining of one or more of the first set of images, a filtering operation on at least one of the one or more motion information samples, wherein the filtering operation comprises identifying a first set of high frequency motion information data and a first set of low frequency motion information data;

cause a first amount of OIS to be applied to one or more images in the first set of images based, at least in part, on the first set of high frequency motion information data;

cause a first amount of electronic image stabilization (EIS) to be applied to one or more images in the first set of images based, at least in part, on the first set of low frequency motion information data and the applied first amount of OIS; and cause the stabilized first set of images to be stored in a memory.

16. The device of claim 15, wherein a first image from the first set of images is associated with a first subset of the motion information samples.

17. The device of claim 16, wherein a second image from the first set of images is associated with a second subset of the motion information samples that is different from the first subset of the motion information samples.

18. The device of claim 17, wherein a second amount of OIS is applied to the first image, and wherein the second amount of OIS applied to the first image is based only on an identified first set of high frequency motion information data from the first subset of the motion information samples.

19. The device of claim 17, wherein a second amount of EIS is applied to the first image, and wherein the second amount of EIS applied to the first image is based on at least an identified first set of low frequency motion information data from the first subset of the motion information samples and an identified first set of low frequency motion information data from the second subset of the motion information samples.

20. The device of claim 15, wherein the filtering operation comprises use of a first cut-off frequency, wherein the first set of high frequency motion data comprises motion data having a frequency component greater than the first cut-off frequency, and wherein the first set of low frequency motion data comprises motion data having a frequency component less than the first cut-off frequency.

* * * * *